United States Patent
Okano et al.

(10) Patent No.: US 8,733,201 B2
(45) Date of Patent: May 27, 2014

(54) STEERING APPARATUS FOR VEHICLE

(75) Inventors: Ryota Okano, Hamamatsu (JP); Akio Osuka, Kyoto (JP)

(73) Assignee: JTEKT Corporation, Osaka (JP)

( * ) Notice: Subject to any disclaimer, the term of this patent is extended or adjusted under 35 U.S.C. 154(b) by 273 days.

(21) Appl. No.: 13/413,088

(22) Filed: Mar. 6, 2012

(65) Prior Publication Data

US 2012/0234127 A1  Sep. 20, 2012

(30) Foreign Application Priority Data

Mar. 14, 2011   (JP) ................................ 2011-054992

(51) Int. Cl.
B62D 1/16 (2006.01)
(52) U.S. Cl.
USPC ............................... 74/492; 74/493; 280/775
(58) Field of Classification Search
USPC ............................ 74/492, 493; 280/775, 777
See application file for complete search history.

(56) References Cited

U.S. PATENT DOCUMENTS

| | | | | |
|---|---|---|---|---|
| 5,242,195 | A * | 9/1993 | Wendling | 280/777 |
| 5,485,376 | A * | 1/1996 | Oike et al. | 701/41 |
| 5,718,132 | A * | 2/1998 | Riefe et al. | 70/186 |
| 5,813,699 | A | 9/1998 | Donner et al. | |
| 5,992,191 | A * | 11/1999 | Nickeas et al. | 70/218 |
| 6,776,251 | B2 * | 8/2004 | Landmann | 180/287 |
| 7,097,205 | B2 * | 8/2006 | Camp et al. | 280/775 |
| 7,234,328 | B2 * | 6/2007 | Okuno et al. | 70/186 |
| 8,272,291 | B2 * | 9/2012 | Fasone | 74/491 |
| 8,459,401 | B2 * | 6/2013 | Suzuki | 180/444 |
| 8,596,160 | B2 * | 12/2013 | Nagamura et al. | 74/492 |
| 2005/0029795 | A1 | 2/2005 | Camp et al. | |
| 2011/0239809 | A1 | 10/2011 | Beneker et al. | |

FOREIGN PATENT DOCUMENTS

DE  10 2009 055 021 A1  7/2010
FR  2 937 598  4/2010

OTHER PUBLICATIONS

Feb. 5, 2013 Extended European Search Report issued in European Application No. 12158631.7.

* cited by examiner

*Primary Examiner* — David M Fenstermacher
(74) *Attorney, Agent, or Firm* — Oliff PLC

(57) ABSTRACT

It is an object of the present invention to provide a steering apparatus for a vehicle mounting a steering lock device to an upper tube by small numbers of constructing parts.
A guide supporting mechanism guiding and supporting a upper tube in relation to a lower housing along an axial direction of the upper tube includes a guide bracket portion fixed to the upper tube, and a guide portion mounted in the lower housing to guide and support the guide bracket along the axial direction of the guide tube. A steering lock device locking and unlocking rotation of the upper shaft includes a lock housing guiding a cylinder in back and forth direction, and a lock bracket portion mounted in a shape of grasping the upper tube by the lock housing therewith. The guide bracket and the lock bracket portion are formed to one piece as a whole.

3 Claims, 9 Drawing Sheets

STEERING APPARATUS FOR VEHICLE

INCORPORATION BY REFERENCE

The present application claims priority under 35 U.S.C. §119 to Japanese Patent Application No. 2011-054992, filed on Mar. 14, 2011. The content of this application is incorporated herein by reference in the entirety.

BACKGROUND OF THE INVENTION

1. Field of the Invention

The present invention relates to a steering apparatus for a vehicle being able to adjust a position of a steering wheel by moving an upper tube in relative to a lower tube along an axial direction to adjust telescopically.

2. Description of the Related Art

It is well known a steering apparatus for a vehicle as a prior art disclosed in US publication 2005/0029795 shown in FIG. 8 and FIG. 9 in this specification of the present invention. A guide bracket 102 is fixed by welding to an upper tube 101 supporting an upper shaft 100 rotatably and the guide bracket 102 is guided and supported by a lower housing 110 adjustably to be telescoped as shown in FIG. 8 and FIG. 9. A tightening bolt 130 is inserted into a tilting groove 121 of a supporting bracket 120, penetrating hole 111 of the lower housing 110 and a telescopic groove 103 of the guide bracket 102. A head portion 131 of the tightening bolt 130 is moved to a side of a cam mechanism 150 on the tightening bolt 130 by the cam mechanism 150 when a tightening bolt 130 with a lever 140 is rotated. Thereby, the guide bracket 102 and the lower housing 110 are pushed to the supporting bracket 120, thereby to lock the upper tube 101 against the supporting bracket 120.

Where it is unlocked by the tightening bolt 130, the lower housing 110 and the upper tube 101 are able to be adjusted in tilting along the tilting groove 121 and the upper tube 101 is able to be adjusted along the telescopic groove 103.

An un-illustrated steering lock device is mounted to a block 104 of the upper tube 101 to lock rotation of the upper shaft 100 by the way that a cylinder of the steering lock device is inserted into a key groove 161 of a collar 160 fixed to the upper shaft 100.

The prior art explained above has the disadvantage that the block 104 must be welded to the upper tube 101 and the steering lock device is welded to the block 104, thereby it needs more number of constructing parts and it is not easy to mount parts because of welding.

SUMMARY OF THE INVENTION

In view of the previously mentioned circumstances, it is an object of the present invention to provide a steering apparatus for a vehicle mounting a steering lock device to an upper tube by small numbers of constructing parts.

In order to achieve the above and other objects, one aspect of the present invention provides a steering apparatus for a vehicle comprising a lower shaft, an upper shaft connected to the lower shaft movably thereto along an axial direction and transmitting rotation to the lower shaft, an upper tube supporting the upper shaft rotatably, a lower housing supporting the lower shaft rotatably, a supporting mechanism at a lower side supporting the lower housing relatively to the vehicle, a supporting mechanism at an upper side supporting the upper tube relatively to the vehicle, and a steering lock device locking and unlocking rotation of the upper shaft, the supporting mechanism at the upper side includes a guide supporting mechanism guiding and supporting the upper tube against the lower housing along an axial direction of the upper tube, and a locking mechanism locking the upper tube relatively to the vehicle at an axial position after the axial position of the upper tube is adjusted relatively to the lower housing, the steering lock device includes a key groove mounted in the upper shaft, a cylinder engaging with the key groove at a rotational direction, an actuator inserting and separating the cylinder into and from the key groove, a lock housing guiding the cylinder movably in back and forth direction, and a lock bracket portion mounted in a shape grasping the upper tube by the lock housing therewith, the guide supporting mechanism includes a guide bracket fixed to the upper tube, and a guide portion mounted in the lower housing to guide and support the guide bracket along an axial direction of the upper tube, and the guide bracket and the lock bracket portion are formed to one piece as a whole. It is therefore possible for the present invention to mount the steering lock device to the upper tube by small number of constructing parts.

The second aspect of the present invention provides a steering apparatus for a vehicle wherein mainly the lower housing includes the guide bracket portion and a cylindrical portion, and the cylindrical portion is formed cylindrically over a substantial axial length of the cylindrical portion. Therefore, the present invention can enforce stiffness of the cylindrical portion more strongly than stiffness of the prior steering apparatus for the vehicle having the cylindrical portion with the undercut portion at the side of the steering lock device to prevent from overlapping with other member.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
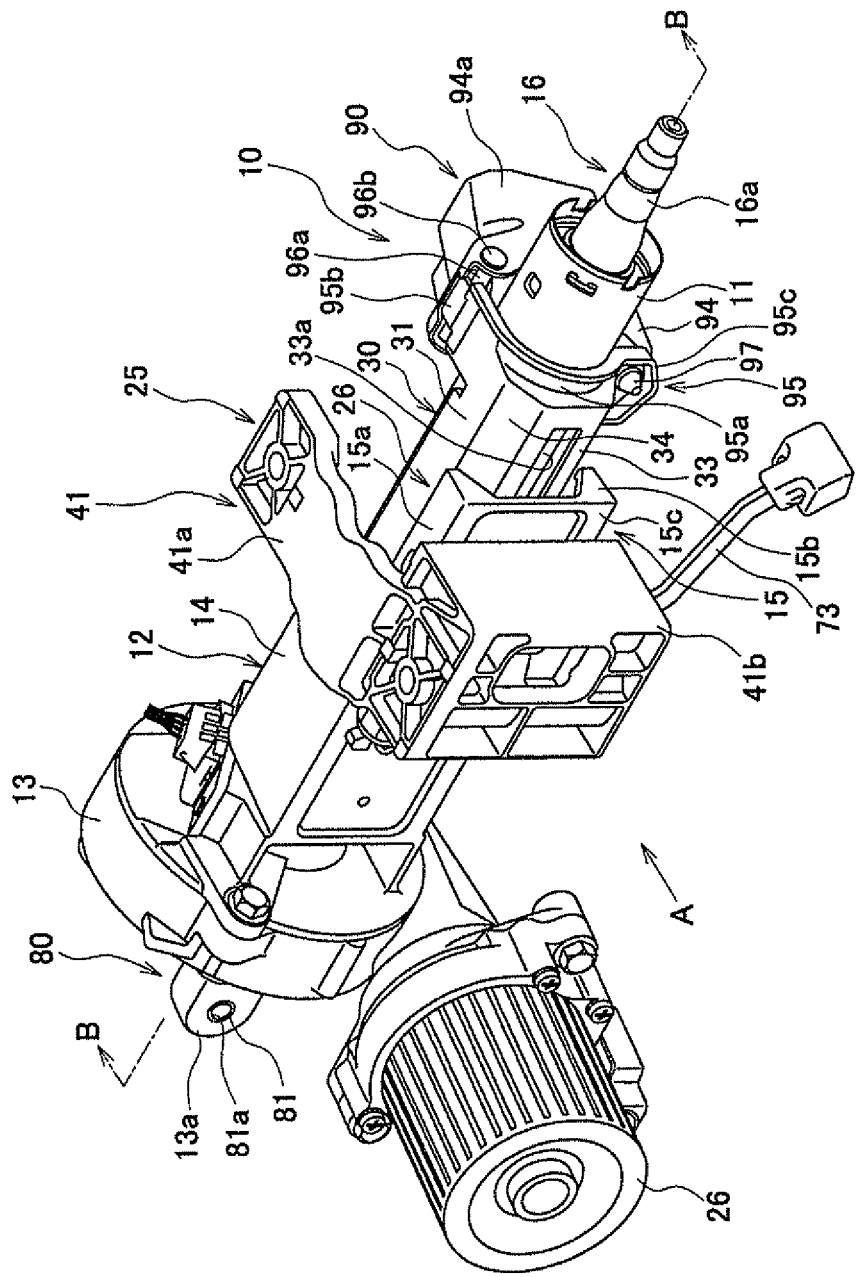
FIG. 1 is a perspective view of one embodiment of a steering apparatus for a vehicle according to the present invention.
Figure 6:
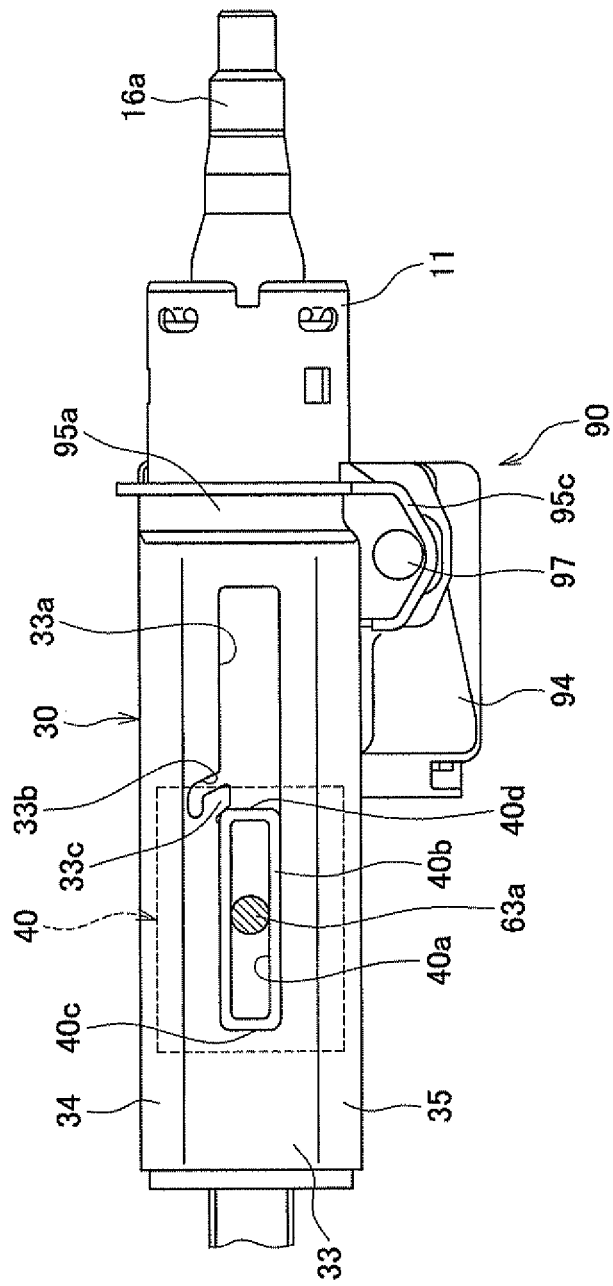
FIG. 6 is a detail drawing of one embodiment of the steering apparatus for the vehicle according to the present invention eliminating a lock housing from the drawing of FIG. 5.
Figure 7:
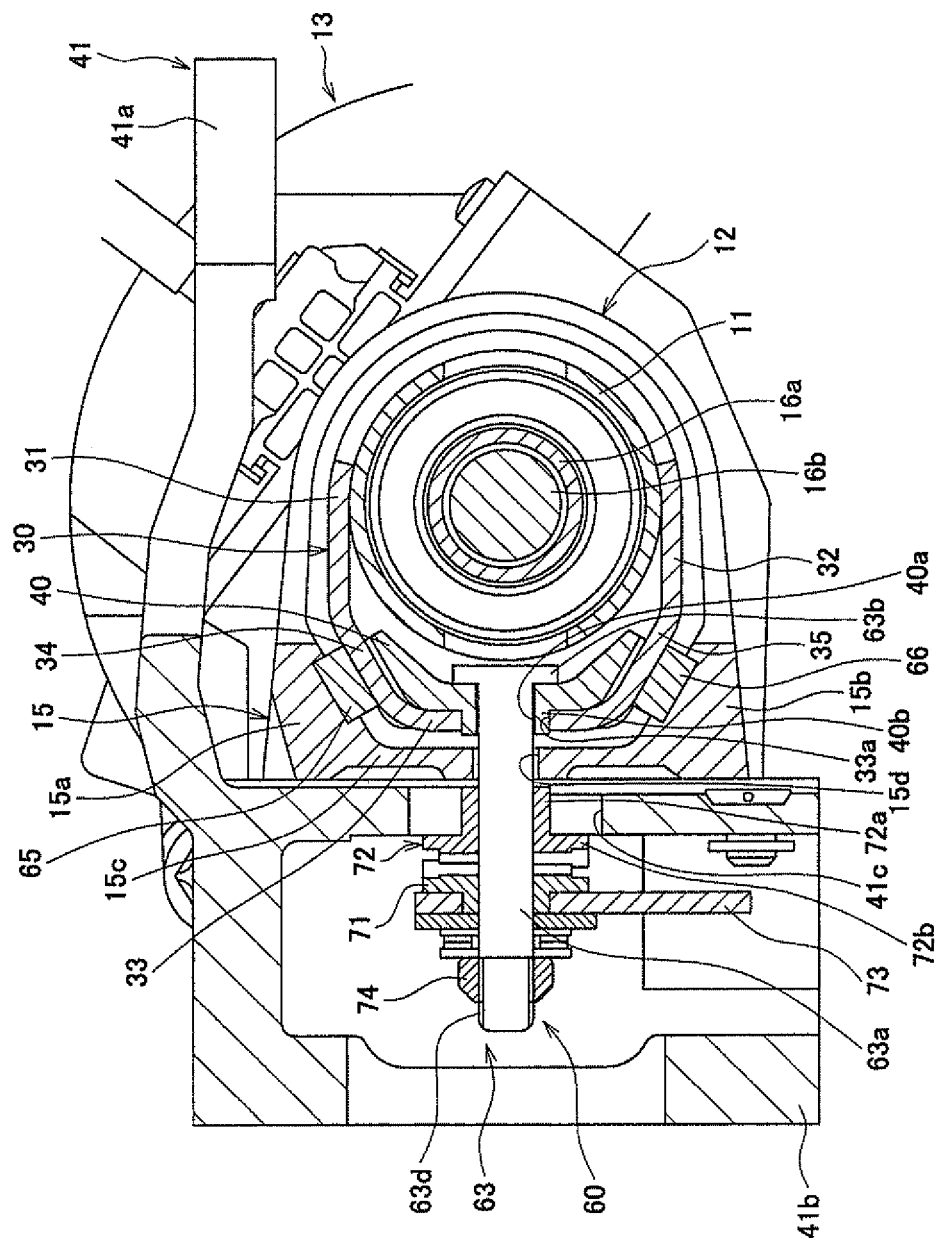
FIG. 7 is an enlarged schematic drawing f one embodiment of the steering apparatus for the vehicle according to the present invention from the drawing of FIG. 4.
Figure 8:
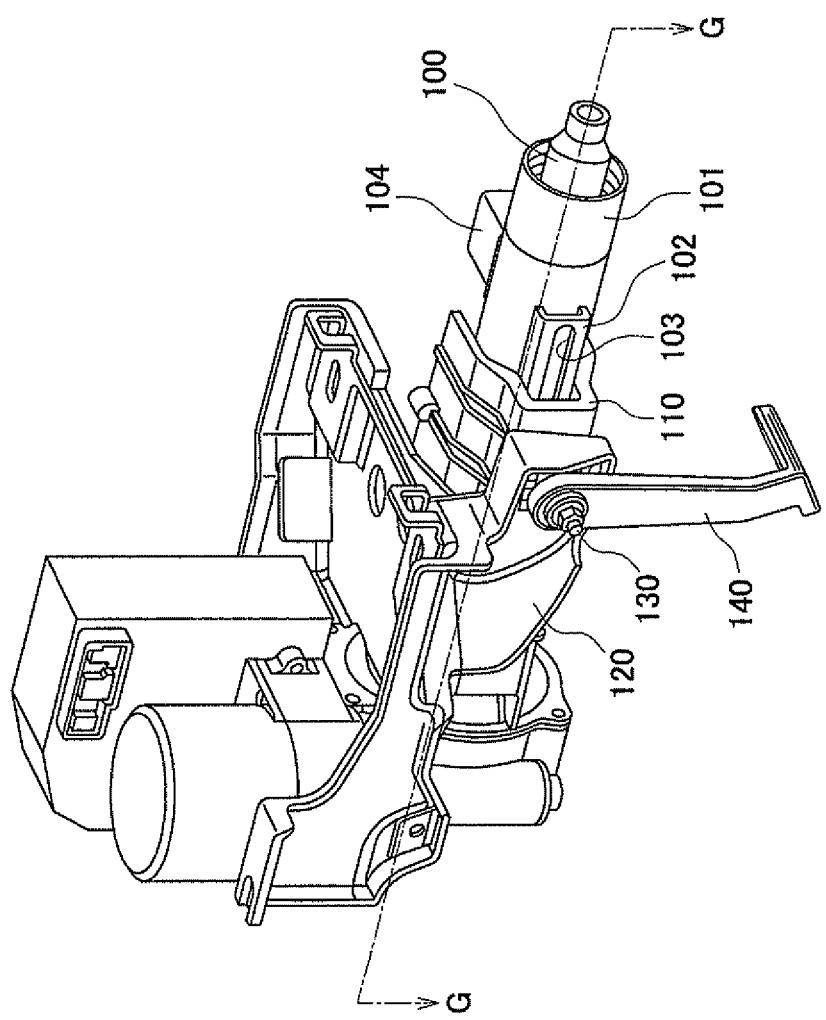
FIG. 8 is a perspective view of a steering apparatus for a vehicle of a prior art.
Figure 9:
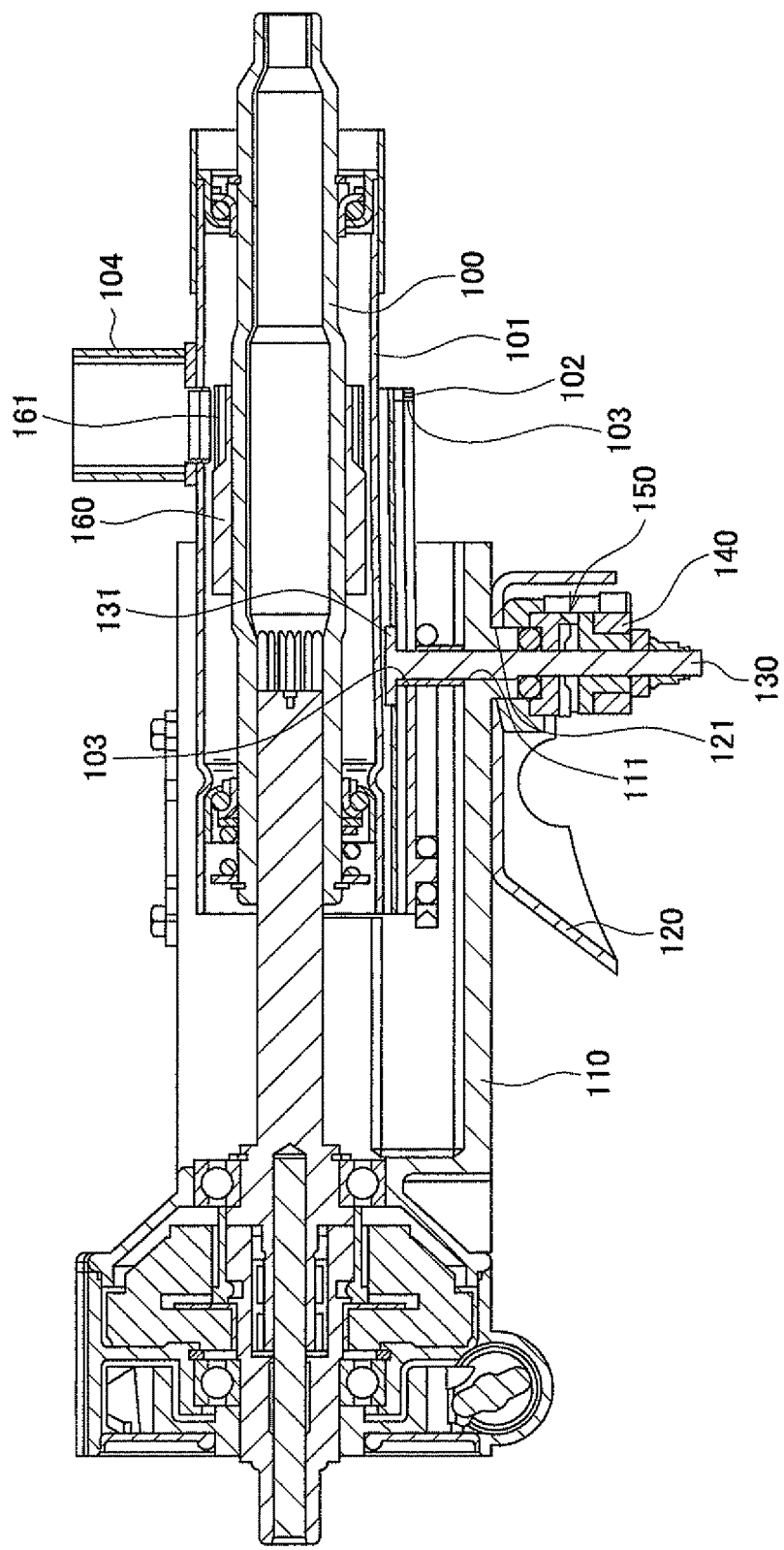
FIG. 9 is a sectional drawing of the steering apparatus for the vehicle of the prior art along G-G line.

A preferred embodiment of a steering apparatus for a vehicle according to the present invention will be described in referring to FIG. 1 to FIG. 7. The steering apparatus for the vehicle 10 includes an upper tube 11 being moveably mounted in back and forth along an axial direction with a space relative to a lower housing 12 as shown in FIG. 3. The lower housing 12 includes a gear housing portion 13, a hollow cylindrical portion 14 and a guide portion 15 and the hollow cylindrical portion 14 and the guide portion 15 are molded with a cast as a whole with these portions as shown in FIG. 1. As shown in FIG. 3 and FIG. 7, the hollow cylindrical portion 14 is formed cylindrically over a substantial axial length of the hollow cylindrical portion 14 in order to enforce stiffness of the hollow cylindrical portion 14 more strongly than stiffness of a prior power steering having a hollow cylindrical portion with an undercut portion at a side of a steering lock device, explained hereinafter, to prevent from overlapping with other member. Therefore, the lower housing 12 has the hollow cylindrical portion 14 without undercutting at the side of the steering lock device.

First intermediate shaft 20 and second intermediate shaft 21 are rotatably supported by the gear housing portion 13 at separated positions respectively along the axial direction. The first intermediate shaft 20 and the second intermediate shaft 21 are connected to be rotated with each other through a torsion bar 22 and a torque sensor 23 is mounted on the gear housing 13 to detect an amount of relative rotation of the first intermediate shaft 20 and the second intermediate shaft 21.

A worm wheel gear 24 is fixed to be fitted into the second intermediate shaft 21 and a worm gear 25 is engaged in mesh with the worm wheel gear 24. A driving shaft of a driving motor 26 shown in FIG. 1 is connected to the worm gear 25 to transmit torque of the driving motor 26 to the second intermediate shaft 21 through the worm gear 25 and the worm wheel gear 24 in accordance with the torque detected by the torque sensor 23.

A steering shaft 16 is rotatably supported with the upper tube 11 and the lower housing 12. The steering shaft 16 includes an upper shaft 16a rotatably supported by the upper tube 11 and a lower shaft 16b being movable to the hollow cylindrical portion 14 with a wide space. One end of the lower shaft 16b is fit in spline meshing with the upper shaft 16a to be movable in back and forth directions relatively to the upper shaft 16a and to transmit rotation to the upper shaft 16a and the other end of the lower shaft 16b is fixed and fit into the first intermediate shaft 20. The lower shaft 16b is rotatably supported through the first intermediate shaft 20 and the upper shaft 16a by the lower housing 12 indirectly. To one end of the upper shaft 16a is connected an un-illustrated steering wheel steered by a driver, and an un-illustrated intermediate shaft is connected to one end of the second intermediate shaft 21 opposite to the steering wheel.

Figure 2:
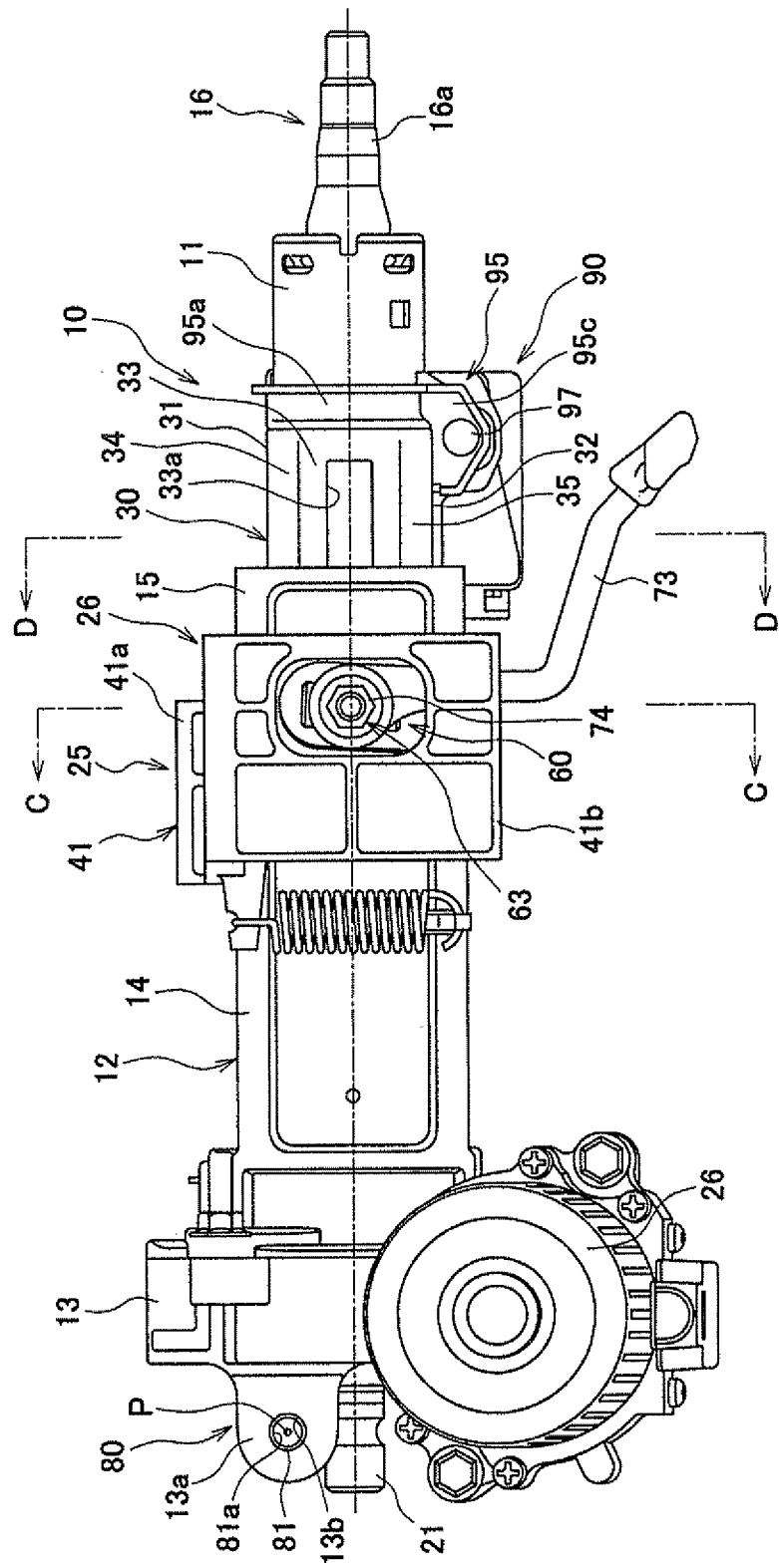
FIG. 2 is a side view of one embodiment of the steering apparatus according to the present invention from A arrow in FIG. 1.
Figure 3:
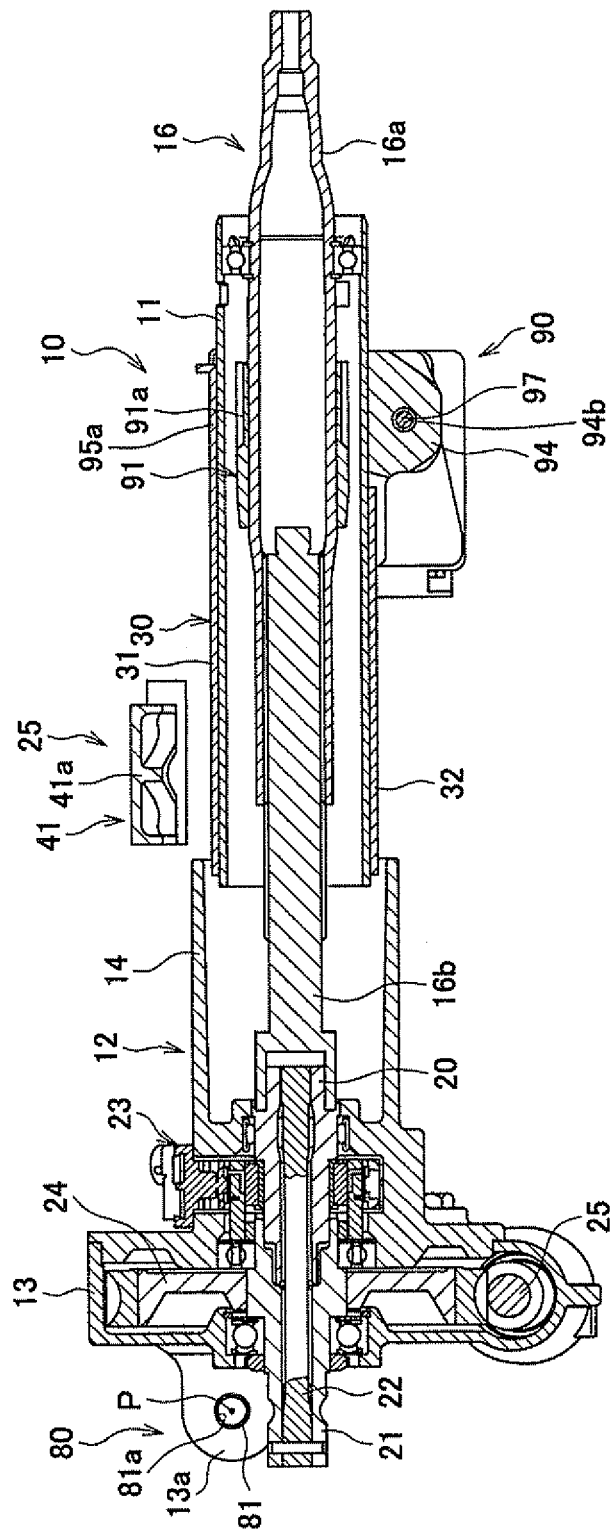
FIG. 3 is a sectional drawing of one embodiment of the steering apparatus for the vehicle according to the present invention along B-B line in FIG. 1.

As shown in FIG. 2, the gear housing portion 13 is supported by an un-illustrated vehicle through a supporting mechanism 80 in lower side and the upper tube 11 is supported to be tilted and moved telescopically relative to the un-illustrated vehicle through a supporting mechanism 25 in upper side. The supporting mechanism 25 in the upper side includes a guide supporting mechanism 26 guiding and supporting the upper tube 11 to be tilted and moved telescopically relative to the un-illustrated vehicle, and a lock mechanism 60 locking the upper tube 11 at a position adjusted to be tilted and moved telescopically relative to the un-illustrated vehicle.

The supporting mechanism 80 at lower side includes a pivot connecting portion 13a formed as a unit with the gear housing portion 13, a bush 81 being fit into a mounting hole 13b of the pivot connecting portion 13a, an un-illustrated shaft supporting pin being fit rotatably into the connecting hole 81a of the bush 81, and an un-illustrated pivot bracket fixed to the un-illustrated vehicle to fix the shaft supporting pin. The gear housing 13 is pivotally supported around an axis P of the shaft supporting pin.

Figure 4:
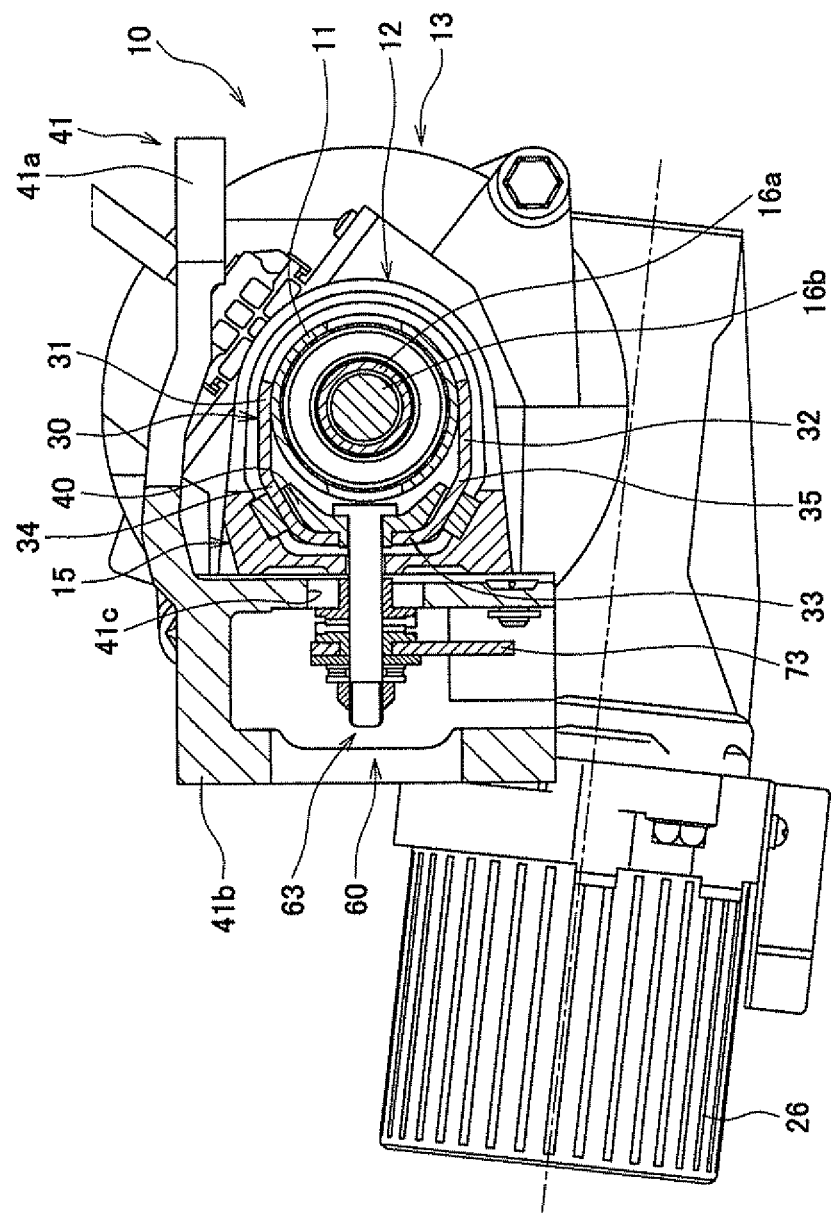
FIG. 4 is a sectional drawing of one embodiment of the steering apparatus for the vehicle according to the present invention along C-C line in FIG. 2.

The guide supporting mechanism 26 includes a guide bracket 30, with a shape of letter C in cross section, fixed by a welding etc to a peripheral surface of the upper tube 11, a collapse plate 40 disposed between the upper tube 11 and the guide bracket 30, a mounting bracket 41 fixed to the vehicle, and the guide portion 15 of the lower housing 12 interposed between the mounting bracket 41 and the guide bracket 30 as shown in FIG. 4.

The guide bracket 30 is formed by punching and bending from one piece of a plate and includes a pair of first board portions 31, 32 extending to a side of the upper tube 11, guide portions 34, 35 inclining relative to the first board portions 31, 32, and a connecting portion 33 connecting the guide portions 34, 35 each other. One ends of the first board portions 31, 32 are fixed respectively to the upper tube 11 by welding etc. The guide portions 34, 35 are mounted between the pair of first board portions 31, 32 and the connecting portion 33 and inclined relative to the board portions 31, 32 and the connecting portion 33. As shown in FIG. 6, in the connecting portion 33 is formed a guide groove 33a for collapse along its axial direction and is formed a groove 33b for forming a collapse projection 33c with a shape of a letter L to be communicated to the guide groove 33a for collapse. The collapse projection 33c is therefore formed by the groove 33b and a part of collapse projection 33c and a part of the collapse projection 33c is projected into the guide groove 33a for collapse.

The collapse plate 40 is approximately a plate shape formed with a mold as a whole. In the collapse plate 40 is formed a telescopic groove 40a along the axial direction of the upper tube 11. A hub portion 40b is formed as a whole around a peripheral portion of the telescopic groove 40a of the collapse plate 40 to engage with the guide groove 33a. An end 40c of the hub portion 40b at a side of the intermediate shaft engages with an end of the guide groove 33a at a side of the intermediate shaft and an end 40d of the hub portion 40b at a side of the steering wheel engages with the collapse projection 33c. A position of the collapse plate 40 is maintained in a position shown in FIG. 6 to be moved with the guide bracket 30 at telescopic regulation until secondary collision occurs. When the secondary collision occurs, the collapse projection 33e is bended to a side of the groove 33b in order to absorb shocked energy and the hub portion 40b is moved to the steering wheel along the groove 33a.

The mounting bracket 41 is molded with a cast as a whole as shown in FIG. 1. The mounting bracket 41 includes a mounting portion 41a extending along a horizontal direction, one end of which is fixed to the vehicle, and a box portion 41b with a box shape formed at the other end of the mounting portion 41a as a whole. A tilting groove 41c is formed in the box portion 41b around the axis P shown in FIG. 2.

The lock mechanism 60 includes a tightening bolt 63, a pair of plate cams 71, 72 fitted into the tightening bolt 63, a lever 73 rotated with the plate cam 71, and a nut 74 engaged in mesh with a screw portion 63d of the tightening bolt 63 as shown in FIG. 7. The tightening bolt 63 includes a shaft portion 63a, a head portion 63b projected out in radial direction at one end of the shaft portion 63a, and the screw portion 63d at the other end of the shaft portion 63a. The shaft portion 63a, the head portion 63h and the screw portion 63d are formed as a whole by cutting etc.

The pair of plate cams 71, 72 has respectively a cam portion at a faced end each other so that each of the plate cams 71, 72 is approaching or separating each other along its axial direction by the cam portions at relative rotation of each of the plate cams 71, 72. A hub portion 72a of the plate cam 72 is inserted into the tilting groove 41c according to the operation of the cam portions, and a flange portion 72b of the plate cam 72 is thereby engaged with an un-illustrated groove of the first plate portion 41 of the adjusting bracket 40 to restrict the rotation of the plate cam 72.

The guide portion 15 has a shape of letter C in section and includes projecting portions 15a, 15b disposed as a shape intending to grip the guide bracket 30, and plate portion 15c connecting the projecting portions 15a, 15b as shown in FIG. 1 and FIG. 7. Rails 65, 66 are mounted on the projecting portion 15a, 15b to guide and support the guide bracket 30 along the axial direction of the upper tube 11 as shown in FIG. 7. A penetrated hole 15d is formed in the plate 15c to be penetrated by the tightening bolt 63.

Figure 5:
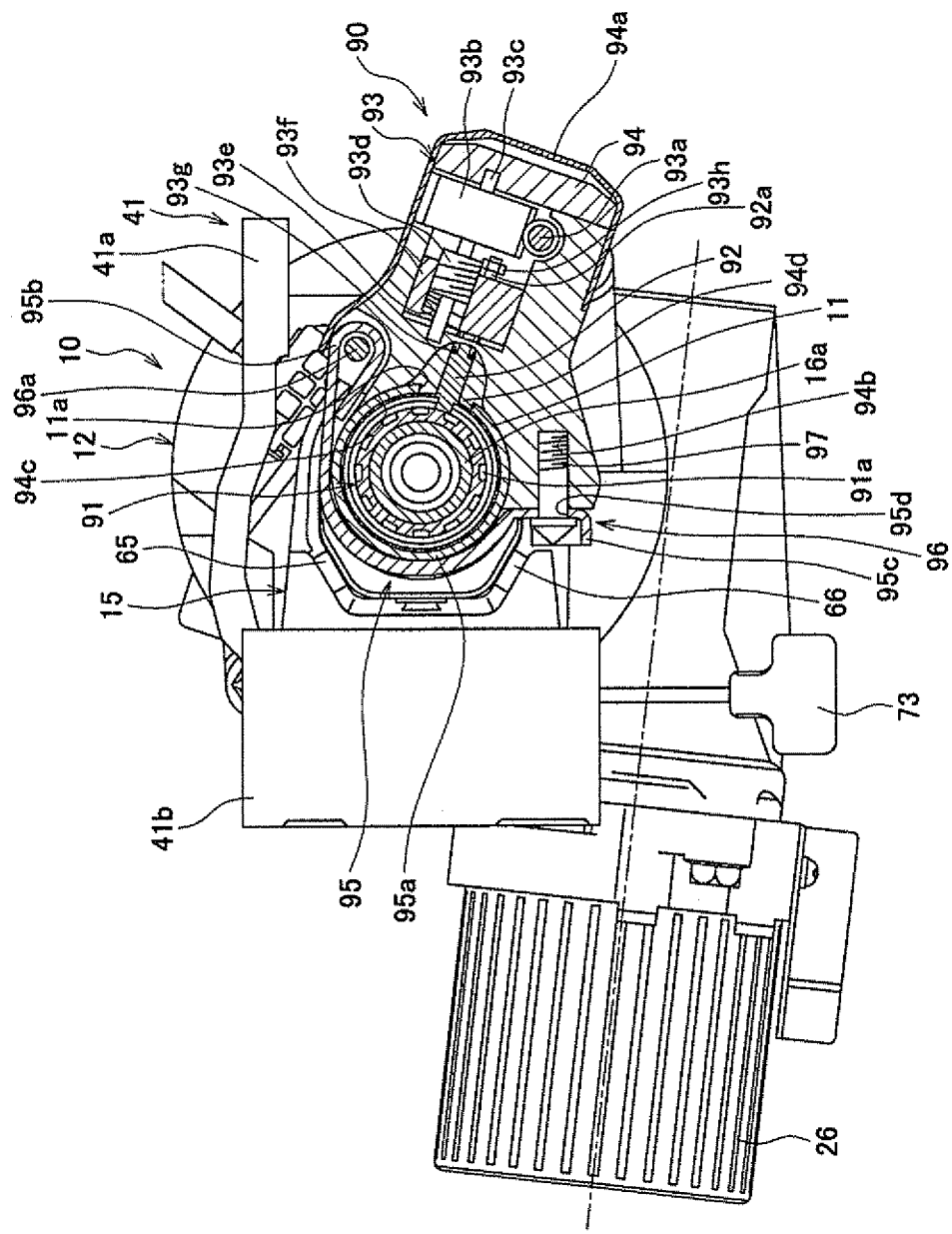
FIG. 5 is a sectional drawing of one embodiment of the steering apparatus for the vehicle according to the present invention along D-D line in FIG. 2.

A steering lock device 90 is fixed at the outer peripheral portion of the upper tube 11 to lock and un-lock a rotation of the upper shaft 16 as shown in FIG. 3 and FIG. 5. The steering lock device 90 includes a collar 91 pressed and fit into the upper shaft 16a, a cylinder 92 engaging with a key groove 91a of the collar 91 in a rotational direction, an actuator 93 operating to insert and separate the cylinder 92 in and from the key groove 91a, a lock housing 94 guiding the cylinder 92 movable back and forth, a lock bracket portion 95 disposed in a shape intending to grasp the upper tube 11 by the lock housing 94 therewith, and a lock device 96 fixing the lock bracket portion 95 to the lock housing 94. The collar 91 forms a plurality of key grooves 91a disposed with equal distance each other along a circumferential direction.

The actuator 93 for the cylinder includes an un-illustrated motor fixed to the lock housing 94, a worm gear 93a connected to a driving shaft of the un-illustrated motor as a whole, a worm wheel gear 93b engaging in mesh with the worm gear 93a, a rotating shaft 93c connected rotatably with the worm wheel gear 93a and supported rotatably by the lock housing 94, a male screw portion 93d formed in the rotating shaft 93c, a female screw portion 93e engaged in mesh with the male screw portion 93d, a movable member 93f formed the female screw portion 93e and guided and supported movably by the lock housing 94, and a push spring 93g disposed between the cylinder 92 and the movable member 93f.

On a surface of the lock housing 94 at a side of the upper tube 11 is formed an engaging surface 94c having a circular portion in section and engaging to outer peripheral surface of the upper tube 11. On a surface of the lock housing 94 at a side of the upper tube 11 is formed a hub portion 94d around a circumferential surface of the cylinder 92 as a shape projecting to a side of the upper tube 11 from the engaging surface 94c. The hub portion 94 is fit into the penetrating hole 11a formed in the upper tube 11. The lock housing 94 is locked its moving along the rotational and axial directions in relative to the upper tube 11 by engaging the hub portion 94 with the penetrating hole 11a.

The cylinder 92 has a small diameter portion 92a and the small diameter portion 92a is inserted into an un-illustrated penetrated hole of the movable member 93f. One end of the small diameter portion 92a has an un-illustrated screw portion engaged and fixed in mesh with the nut 93h. The push spring 93g is inserted between a step portion 92b of the cylinder 92 and the movable member 93f.

The lock bracket portion 95 includes a circular portion 95a engaging with an outer circumferential surface of the upper tube 11, a loop portion 95b bended in a circular shape at one end of the circular portion 95a, and an abutting portion 95c being able to abut to the lock housing 94 at the other end of the circular portion 95a. The circular portion 95a of the lock bracket portion 95 is a part of the guide bracket 30 as best shown in FIG. 3, that is to say the lock bracket portion 95 and the guide bracket 30 are made by one piece as a whole, thereby reducing a number of the parts constructing the steering apparatus of the present invention. In the abutting portion 95c is formed a penetrating hole 95d being penetrated by a locking volt 97 described hereinafter. A lock cover 94a is fixed to the lock housing 94 to cover over a portion of the lock housing 94. A screw hole 94b is formed in the lock housing 94 at a position relative to the penetrating hole 95d.

The locking device 96 includes a shaft supporting pin 96a fixed to the lock cover 94a, the loop portion 95b surrounding the shaft supporting pin 96a, the lock bolt 97 engaging in mesh with the screw hole 94b of the lock housing 94 through the penetrating hole 95d of the lock bracket portion 95 as shown in FIG. 1 and FIG. 5. The shaft supporting pin 96a has a head portion 96b projected in radial direction at one its end in order to prevent the shaft supporting pin 96a from loosing against the lock cover 94a by mounting the un-illustrated lock pin or the lock loop to the other end of the shaft supporting pin 96a after the shaft supporting pin 96a is inserted into the lock bracket 95 and the loop portion 95b.

It will be explained the operation of mounting the steering lock device 90 to the upper tube 11 hereinafter. As shown in FIG. 5, the engaging surface 94c of the lock housing 94 is abutted to the circumferential surface of the upper tube 11 and the hub portion 94d is fit to the penetrating hole 11a. The shaft supporting pin 95a is inserted to the lock cover 94a and the loop portion 95b and the un-illustrated lock pin or lock loop is mounted to the other end of the shaft supporting pin 96. The lock bolt 97 is inserted into the penetrating hole 95d and the lock bolt 97 is engaged in mesh with the screw hole 94b. As a result, the lock housing 94 is locked to the upper tube 11 in a shape that the upper tube 11 is grasped by the lock bracket portion 95 and the lock housing 94.

It will be explained the operation of locking the rotation of the upper shaft 16a by the steering lock device 90. The worm gear 93a is rotated by the un-illustrated motor to locking direction. The rotation of the worm gear 93a is transformed to axial movement of the movable member 93f through the worm wheel gear 93b, the male screw portion 93d and the female screw portion 93e. The movable member 93f is moved to a side of the upper tube 11 along the axial direction and the cylinder 92 is pressed to be entered into the key groove 91a by the press spring 93g. If the cylinder 92 is not inserted into the key groove 91a, the upper shaft 16a is rotated by the steering wheel to engage the cylinder 92 into the key groove 91a surely, thereby locking the rotation of the upper shaft 16a.

It will be explained the opposite operation of unlocking the rotation of the upper shaft 16a by the steering lock device 90. The worm gear 93a is rotated by the un-illustrated motor to unlocking direction. The movable member 93f is moved to opposite side of the upper tube 11 along the axial direction and the cylinder 92 is retracted to opposite side of the upper tube 11 through nut 93h. The cylinder 92 is unlocked from the key groove 91a to allow the rotation of the upper shaft 16a.

Based on the steering apparatus of one embodiment of the present invention explained above, it achieves a small number of parts by the construction that the lock bracket portion 95 and the guide bracket 30 are made by one piece as a whole. And also, since the lock housing 94 is fixed to the upper tube 11 in a way of grasping by the lock bracket portion 95 and the lock housing 94, it is easily to lock the lock housing in comparison with the locking method of the prior art.

It will be described the operation of the telescopic and tilting adjustment of the upper tube 11 in accordance with a physique and an attitude of the driver hereinafter. As shown in FIG. 7, when the lever 73 is rotated to loose the lock mechanism 60, the plate cams 71, 72 are moved to approach each other along its axial direction to reduce the force pressing the collapse plate 40 and the guide bracket 30 to the guide portion 15 through the head portion 63b. In this state, where the driver wants the telescopic adjustment, the driver withdraws or pushes the steering wheel with the upper tube 11. The guide bracket 30 is moved along the rails 65, 66 and the shaft portion 63a is moved along the telescopic groove 40a. Where the driver wants the tilting adjustment, the driver tilts the steering wheel. The upper tube 11 is rotated around the axis P with the lower housing 12, thereby to move the hub portion 72a of the plate cam 72 along the tilting groove 41c.

After the upper tube 11 is adjusted to the desired telescopic and tilting positions for the driver and the lever 73 is rotated to locking direction for the lock mechanism 60, the plate cams 71, 72 are moved to be separated each other to increase the force pressing the collapse plate 40 and the guide bracket 30 to the guide portion 15, thereby increasing the force to press the guide portion 15 to the box portion 41b. Thereby, the upper tube 11 is locked against the bracket 41 at the desired telescopic and tilting positions.

Based on the steering apparatus of one embodiment of the present invention explained above, since the mounting bracket 41, the lock housing 94 and the collapse plate 40 are molded with the cast and it is constructed that the guide portion 15 is pressed to the box portion 41b in one direction and the collapse plate 40 and the guide bracket 30 are pressed to the guide portion 15 in one direction, there is a quite small noise based on the bracket's interference at the steering wheel operation in comparison with the prior art that the distance bracket and the adjusting bracket are made with the steel plate and the distance bracket with the letter C shape grasps the adjust bracket with the letter C shape from both sides.

Furthermore, the hollow cylindrical portion 14 of the lower housing 12 is formed cylindrically over the substantial axial length of the hollow cylindrical portion 14 in order to enforce stiffness of the hollow cylindrical portion 14 more strongly than stiffness of the prior steering apparatus for the vehicle having the hollow cylindrical portion with the undercut portion at the side of the steering lock device to prevent from overlapping with other member. In other words, the lower housing 12 has the hollow cylindrical portion 14 without undercutting at the side of the steering lock device.

While the invention has been described in detail with reference to the preferred embodiment, it will be apparent to those skilled in the art that the invention is not limited to the present embodiment, and that the invention may be realized in various other embodiments within the scope of the claims.

For example, while one embodiment of the present invention has the construction that the cylinder 92 and the movable member 93f are mounted in parallel and the rotation is transferred to the axial movement by the male screw portion 93d and the female screw portion 93e, however it is not restricted to the construction but it may have the construction that a hollow cylindrical movable member 93f is mounted on the outer peripheral surface with same axis and the rotation is transferred to the axial movement by a cam mechanism mounted between the cylinder 92 and the movable member 93f.

What is claimed is:

1. A steering apparatus for a vehicle comprising;
    a lower shaft;
    an upper shaft connected to said lower shaft movably thereto along an axial direction and transmitting rotation to said lower shaft;
    an upper tube supporting said upper shaft rotatably;
    a lower housing supporting said lower shaft rotatably;
    a supporting mechanism at a lower side supporting said lower housing relatively to said vehicle;
    a supporting mechanism at an upper side supporting said upper tube relatively to said vehicle; and
    a steering lock device locking and unlocking rotation of said upper shaft;
    said supporting mechanism at said upper side includes a guide supporting mechanism guiding and supporting said upper tube against said lower housing along an axial direction of said upper tube, and a locking mechanism locking said upper tube relatively to said vehicle at an axial position after said axial position of said upper tube is adjusted relatively to said lower housing;
    said steering lock device includes a key groove mounted in said upper shaft, a cylinder engaging with said key groove at a rotational direction, an actuator inserting and separating said cylinder into and from said key groove, a lock housing guiding said cylinder movably in back and forth direction, and a lock bracket portion mounted in a shape grasping said upper tube by said lock housing therewith;
    said guide supporting mechanism includes a guide bracket fixed to said upper tube, and a guide portion mounted in said lower housing to guide and support said guide bracket along an axial direction of said upper tube; and
    said guide bracket and said lock bracket portion are formed to one piece as a whole.

2. A steering apparatus for a vehicle according to claim 1, wherein said lower housing includes said guide bracket portion and a cylindrical portion, and said cylindrical portion is formed without undercutting at a side of said steering lock device.

3. A steering apparatus for a vehicle according to claim 2, wherein said cylindrical portion is formed cylindrically over a substantial axial length of said cylindrical portion.

* * * * *